(12) United States Patent
Deaville et al.

(10) Patent No.: US 11,106,089 B2
(45) Date of Patent: Aug. 31, 2021

(54) HIGH-POWER DYNAMIC LENS

(71) Applicant: MAGNA INTERNATIONAL INC., Aurora (CA)

(72) Inventors: Todd Deaville, Markham (CA); Vito Abate, Etobicoke (CA)

(73) Assignee: MAGNA INTERNATIONAL INC., Aurora (CA)

( * ) Notice: Subject to any disclaimer, the term of this patent is extended or adjusted under 35 U.S.C. 154(b) by 236 days.

(21) Appl. No.: 16/093,240

(22) PCT Filed: Apr. 12, 2017

(86) PCT No.: PCT/CA2017/000086
§ 371 (c)(1),
(2) Date: Oct. 12, 2018

(87) PCT Pub. No.: WO2017/177310
PCT Pub. Date: Oct. 19, 2017

(65) Prior Publication Data
US 2020/0285119 A1    Sep. 10, 2020

Related U.S. Application Data

(60) Provisional application No. 62/321,300, filed on Apr. 12, 2016.

(51) Int. Cl.
*G02F 1/1337* (2006.01)
*B29C 64/268* (2017.01)
*B33Y 30/00* (2015.01)

(52) U.S. Cl.
CPC ...... *G02F 1/133711* (2013.01); *B29C 64/268* (2017.08); *B33Y 30/00* (2014.12); *G02F 1/133769* (2021.01)

(58) Field of Classification Search
CPC ...... G02F 1/293; G02F 1/3515; G02F 1/0126; G02F 1/0338; G02F 2002/13; B29C 64/268; B29C 64/277
See application file for complete search history.

(56) References Cited

U.S. PATENT DOCUMENTS

| 6,366,388 B1 | 4/2002 | Hampp | |
| 2007/0026165 A1* | 2/2007 | Okabe | C09K 19/18 428/1.1 |

(Continued)

FOREIGN PATENT DOCUMENTS

| CN | 101925855 A | 12/2010 |
| WO | 2012172366 A1 | 12/2012 |
| WO | 2015184549 A1 | 12/2015 |

OTHER PUBLICATIONS

Damberg et al.; "Efficient Freeform Lens Optimization for Computational Caustic Displays." Optics Express 23.8 (pub. Apr. 13, 2015).

(Continued)

*Primary Examiner* — Jessica M Merlin
(74) *Attorney, Agent, or Firm* — Dickinson Wright PLLC

(57) ABSTRACT

A dynamic lens for projecting different output beam shapes includes a first light source of laser diodes generating a first light beam toward a target. A projector generates a second light beam with a different wavelength than the first light beam. A beam combiner combines the first light beam together with the second light beam and directs the combined beams to a focusing plane that includes a lensing array to focus the first light beam into the output beam shape on the target. The lensing array includes a plurality of photoactive cells including at least one photoreactive group which changes molecular shape in response to light energy from the second light beam, thereby changing the orientation of adjacent liquid crystal molecules, which in turn alters the (Continued)

index of refraction of the photoactive cell. A method of operating the dynamic lens to generate the output beam shape is also disclosed.

19 Claims, 12 Drawing Sheets

(56) References Cited

U.S. PATENT DOCUMENTS

| | | | |
|---|---|---|---|
| 2011/0170039 A1* | 7/2011 | Bos | G02F 1/133753 |
| | | | 349/88 |
| 2014/0104664 A1 | 4/2014 | Lee et al. | |
| 2014/0252687 A1* | 9/2014 | El-Dasher | B33Y 80/00 |
| | | | 264/497 |
| 2015/0268495 A1* | 9/2015 | Kizaki | G02F 1/133784 |
| | | | 349/33 |
| 2017/0120530 A1* | 5/2017 | DeMuth | G02B 7/16 |
| 2017/0285572 A1* | 10/2017 | Hunt | G03H 1/02 |
| 2017/0289506 A1* | 10/2017 | Hunt | H04N 9/312 |

OTHER PUBLICATIONS

Damberg et al.; "High Brightness HDR Projection Using Dynamic Freeform Lensing" ACM Transactions on Graphics May 2016.

Marshall, K. L., E. R. Sekera, and K. Xiao; "Computational chemistry modeling and design of photoswitchable alignment materials for optically addressable liquid crystal devices." University of Rochester Laboratory for Laser Energetics LLE Review vol. 143 Apr.-Jun. 2015.

Search Report in Corresponding Chinese application 201780022868.3 dated Jul. 30, 2020.

* cited by examiner

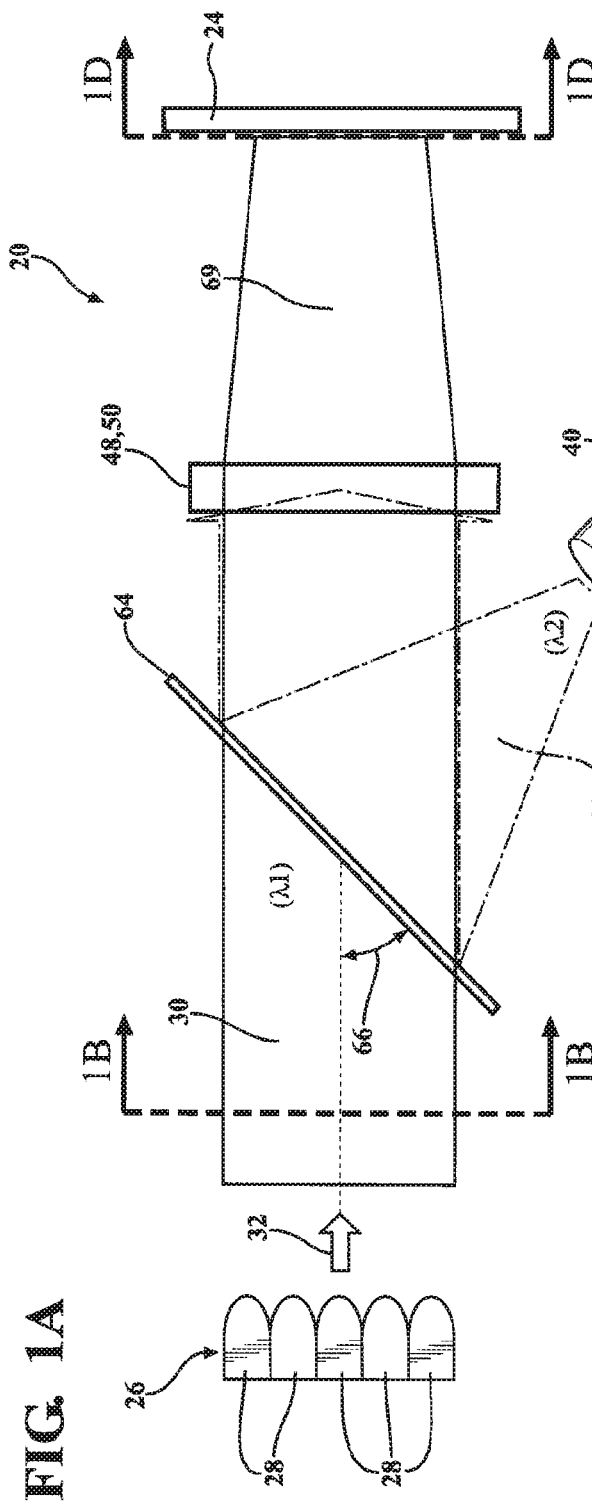
FIG. 1A
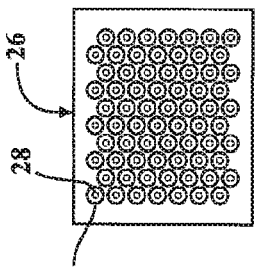
FIG. 1E
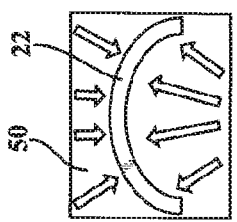
Output Beam Shape at Target
FIG. 1D
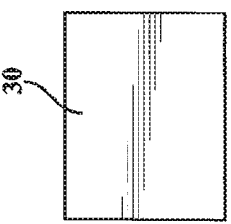
Light is Redirected at focusing Plane
FIG. 1C
Input Beam Shape
FIG. 1B

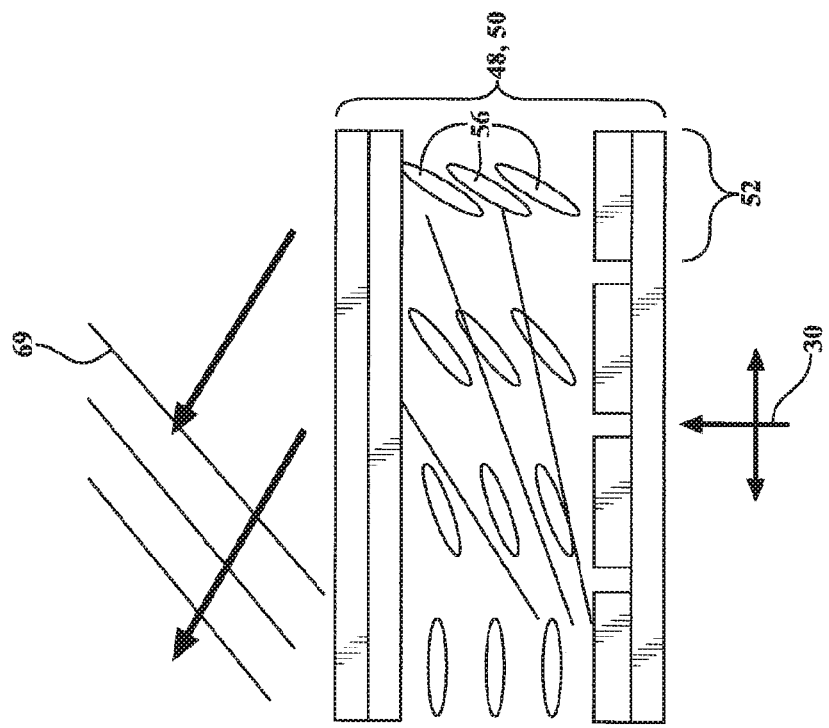
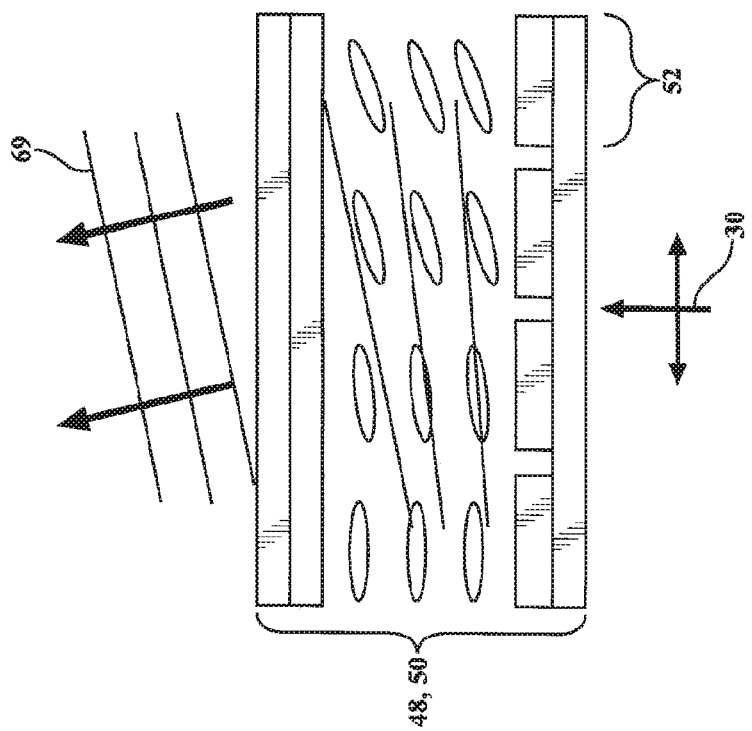
FIG. 2A
FIG. 2B

HIGH-POWER DYNAMIC LENS

CROSS REFERENCE TO RELATED APPLICATION

This U.S. National Stage Patent Application claims the benefit of PCT International Patent Application Serial No. PCT/CA2017/000086 filed Apr. 12, 2017 entitled "High-Power Dynamic Lens" which claims the benefit of and priority to U.S. Provisional Patent Application Ser. No. 62/321,300, filed on Apr. 12, 2016, the entire disclosures of the applications being considered part of the disclosure of this application, and hereby incorporated by reference.

BACKGROUND OF THE INVENTION

1. Field of the Invention

A dynamic lens for projecting different output beam shapes upon a target.

2. Discussion

Lenses are used in various applications including forming a high-power light beam into an output beam shape on a target for applications such as welding and additive manufacturing ("AM"). Such lenses must be able to withstand exposure to high-power light beams through a large number of cycles or pulses throughout the lifetime of the lens. Dynamic type lenses are capable of changing to form a light beam into different shapes. Thus far, dynamic lenses have not been suitable for high-power applications because available dynamic lenses have required electrodes or other fragile materials that are damaged by the high-power light beams passing therethrough.

Advancements have been made recently in the field of programmable freeform (i.e., dynamic) lenses which employ "a phase modulation pattern to project a pre-defined caustic image on a designated image plane." One such programmable freeform lens arrangement is disclosed in Damberg et al. "Efficient Freeform Lens Optimization for Computational Caustic Displays." Optics Express 23.8 (pub. 13 Apr. 2015). Dynamic lenses so far known, including those disclosed in the Damberg et al. article, have employed traditional Liquid Crystal on Silicon (LCOS) based technology, such as spatial light modulator (SLM) devices used in video projectors, making them unsuitable for high-power applications.

Adaptive masks have recently been developed that can form a high-power light beam into different output shapes using photoactive liquid crystals. See, for example, Marshall et al. "Computational Chemistry Modeling and Design of Photoswitchable Alignment Materials for Optically Addressable Liquid Crystal Devices." 142 LLE Review at 151 (2015). U.S. Patent Application Publication No. 2014/0252687 (Sep. 11, 2014) discloses a system for performing additive manufacturing ("AM") with a mask that uses liquid crystals to modify the polarization of a portion of a high-power light beam which is then masked by a polarizing mirror, allowing the remainder to pass through to a substrate target.

Because a portion of the high-power light beam is masked from the target and is, therefore, unavailable for useful work in systems that use adaptive masks, there remains a need for an adaptive lens that is capable of forming substantially all of a high-power light beam passing therethrough into an output beam shape on a target.

A dynamic lens according to the present invention allows for targets or frames that vary in size within the limits of the size of the lensing array. A dynamic lens also allows for variable power density depending on frame size. This means that frame size may increase as part density decreases. Also, unlike systems that employ adaptive masks, the build rate on AM systems using a dynamic lens is not dependent on part density (frame utilization).

SUMMARY OF THE INVENTION

The invention provides for a dynamic lens for projecting different output beam shapes upon a target. The dynamic lens includes a first light source generating a first light beam at a first wavelength. A projector including a second light source generates a second light beam having a second wavelength different from the first wavelength and forms the second light beam to an initial pattern. The dynamic lens also includes a focusing plane including a lensing array of photoactive cells for refracting the first light beam in response to stimulation by the second light beam having the second wavelength, and a beam combiner for combining the first light beam with the second light beam and directing the combined light beams onto the focusing plane. The focusing plane includes a lensing array of photoactive cells that form a phase pattern to form the first light beam into the output beam shape on the target in response to stimulation by the second light beam having the second wavelength according to the initial pattern.

The invention in its broadest aspect therefore provides for an output beam shape which is dynamically adjustable, meaning its shape and points of focus can be quickly changed. The invention also provides for an output beam with substantially all of the first light beam transmitted to the target. This is an improvement over prior art "masking" type beam former which mask or direct a portion of the first light beam away from the target in order to create a desired beam shape.

As shown in Table 1, an additive manufacturing process using a masking beam former to make an example "hollow wheel" structure having approximately 18% areal density would take 22 s per layer. Substituting a dynamic lens of the present invention, which directs substantially all of the high-power first light beam to the target, the additive manufacturing process can make the same layer in 5.122 s. This is an improvement of about four (4) times.

TABLE 1

| Hollow Wheel Structure ~18% part areal density | | | |
|---|---|---|---|
| | 25 × 25 mm Mask Frame | Variable Lens | |
| Bound Area | 2695 | 2695 | mm^2 |
| Cross-Sectional Area | 494 | 494 | mm^2 |
| Fill Factor | 18% | 18% | mm^2 |
| Bed 500 mm × 1000 mm Parts/Build | 158 | 158 | |
| Total Section Area | 78052 | 78052 | mm^2 |
| Frame Area | 625 | 4003.7411 | mm^2 |
| Frames Required | 800 | 124.8832 | |
| Frame Pixels | 1,000,000 | 6,405,986 | @ 25 micron |
| Cross-Section Mass | 0.09633 | 0.09633 | g |
| Layer Thickness | 25 | 25 | micron |
| Material | Steel | Steel | |
| Frame Time | 0.025 | 0.025 | s |
| Power Sweep Time | 2 | 2 | s |
| Max Mat'l Area/Frame | 625 | 625 | mm^2 |

TABLE 1-continued

Hollow Wheel Structure ~18% part areal density

|  | 25 × 25 mm Mask Frame | Variable Lens | |
|---|---|---|---|
| Part Area/Frame | 114.5640074 | 625 | mm^2 |
| Layer Time | 22 | 5.12208 | s |

As shown in Table 2, an additional manufacturing process using a masking beam former to make an example "solid lifter" structure having approximately 75% areal density would take 4.4 s per layer. Substituting a dynamic lens of the present invention, which directs substantially all of the high-power first light beam to the target, the additive manufacturing process can make the same layer in 3.62 s, an improvement of 20%.

TABLE 2

Solid Lifter Structure ~75% part areal density

|  | 25 × 25 mm Mask Frame | Variable Lens | |
|---|---|---|---|
| Bound Area | 60,000 | 50,000 | mm^2 |
| Cross-Sectional Area | 45,000 | 45,000 | mm^2 |
| Fill Factor | 75% | 90% | mm^2 |
| Bed 500 mm × 1000 mm | | | |
| Parts/Build | 1 | 1 | |
| Total Section Area | 45,000 | 45,000 | mm^2 |
| Frame Area | 625 | 694.4444 | mm^2 |
| Frames Required | 96 | 64.8 | |
| Frame Pixels | 1,000,000 | 1,111,111 | @ 25 micron |
| Cross-Section Mass | 8.775 | 8.775 | g |
| Layer Thickness | 25 | 25 | micron |
| Material | Steel | Steel | |
| Frame Time | 0.025 | 0.025 | s |
| Power Sweep Time | 2 | 2 | s |
| Max Mat'l Area/Frame | 625 | 625 | mm^2 |
| Part Area/Frame | 468.75 | 625 | mm^2 |
| Layer Time | 4.4 | 3.62 | s |

Numerous applications can be envisioned for a high-power dynamic lens that can form substantially all of a high-power light beam into a desired beam shape. A few such applications are plastic and composite welding, metal welding, conformal cooling for injection molds, conformal cooling for hot stamping molds, metal surface treatment (i.e., polishing, temper, local annealing, laser peening), prototyping, low-medium production volume replacement process for lightweight structural components (i.e., casting; composites). Such a high-power dynamic lens may have applications in many industries including, for example, automotive, aerospace production (brackets, nozzles, pump housings, etc.), military (field repair/service), medical implants, and prototyping.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1A is a schematic diagram of a dynamic lens according to the present disclosure;

FIG. 1B is a cut-away view of the schematic diagram of FIG. 1A, showing the first light beam at section 1B-1B;

FIG. 1C is a cut-away view of the schematic diagram of FIG. 1A, showing a representation of the transformation of the first light beam by the lensing array to form the output beam shape;

FIG. 1D is a cut-away view of the schematic diagram of FIG. 1A, showing the third light beam defining the output beam shape at section 1D-1D;

FIG. 1E is a front view of a laser diode array;

FIG. 2A is a cut-away schematic view of photoactive cells in the lensing array curving a light beam passing therethrough;

FIG. 2B is a cut-away schematic view of photoactive cells in the lensing array curving a light beam passing therethrough;

DESCRIPTION OF THE ENABLING EMBODIMENT

Figure 3:
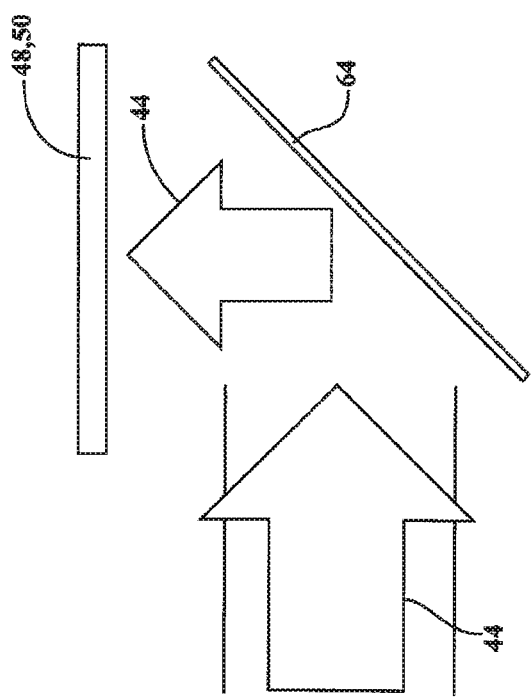
FIG. 3 is a block diagram of portions of a dynamic lens according to the present disclosure.
Figure 3:
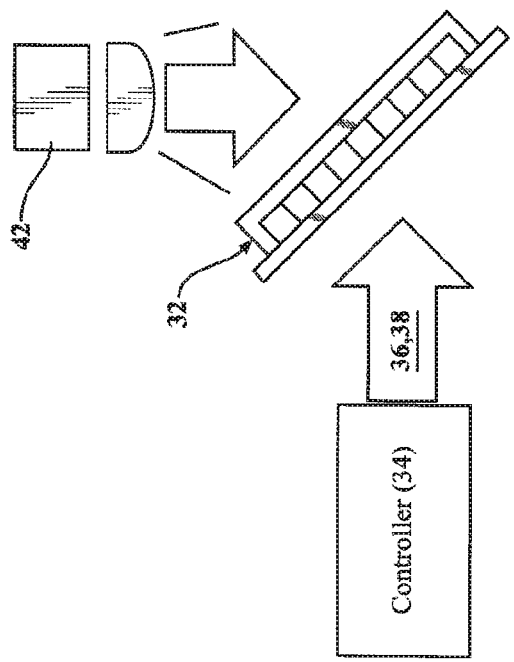

Referring to the Figures, wherein like numerals indicate corresponding parts throughout the several views, a dynamic lens 20 is generally shown for projecting a plurality of different output beam shapes 22 upon a target 24 is generally shown. The dynamic lens 20 includes a first light source 26 of laser diodes 28 generating a first light beam 30 at a high-power sufficient for additive manufacturing techniques such as selective laser sintering (SLS) and a first wavelength λ1 in a path 32 toward the target 24, which may be planar and disposed transverse to the path 32 as shown in FIG. 1A. The first light beam 30 may, for example, have a power of approximately 10 kW or greater. The dynamic lens of the present invention could be used with first light beams 30 having a wide range of power, from 100 W to greater than 100 kW. The target 24 may also be contoured and some or all of the target 24 may be disposed at an acute or obtuse angle to the path 32 of the first light beam 30.

A controller 34 generates a control signal 36 corresponding to an initial pattern 38 and transmits the control signal 36 to a projector 40 which includes a second light source 42 to generate a second light beam 44 with a second wavelength λ2, different from the first wavelength IA, and a spatial light modulator 46 (SLM) to form the second light beam 44 to the initial pattern 38 according to the control signal 36. Many different means may be used to form the initial pattern 38 in the second light beam 44, including but not limited to SLM devices, LCDs, LEDs, pre-printed transparencies, cathode ray beams, Digital Light Processing (DLP) devices, etc. Additional optical components such as lenses and filters may be included as well.

As shown in FIGS. 2A, 2B, a focusing plane 48 including a lensing array 50 of photoactive cells 52 disposed upon a carrier sheet 54 of glass refracts the first light beam 30, with the degree and direction of refraction varying in response to the photoactive cells 52 being stimulated by the second light beam 44 of second wavelength 12. The initial pattern 38 of the second wavelength n light from the projector 40 causes the photoactive cells 52 in the lensing array 50 to form a phase pattern 68 which curves and focuses the first light beam 30 passing therethrough to form the output beam shape 22 on the target 24. The output beam shape 22 may be predetermined, such as in additive manufacturing ("AM") applications where the output beam shape 22 is used to create parts having predetermined shapes like those shown in FIGS. 13-16. The output beam shape 22 may be dynamically generated, such as in rapid prototyping additive manufacturing or in applications where the output beam shape 22 is used to weld parts which may have differing contours, distances, and/or orientation from the focusing plane 48.

As shown in FIG. 1E, the first light source 26 may comprise an array of point sources with each of the point sources generating a portion of the first light beam 30. The point sources may be, for example, individual laser diodes 28. The point sources may be individually controlled on/off or varied in intensity according to a projection map to cause each of the point sources to selectively illuminate a corresponding portion of said focusing plane. A microlens 29 may overlie each of the point sources to focus and direct the portion of the first light beam 30 from the corresponding point source.

In practice, the arrangement of the present disclosure may allow for output beam shapes 22 which are beyond the capacity of the lensing array 50 acting upon a full-frame first light beam 30 directed upon the entire frame of the focusing plane 48. For example, the lensing array 50 may not be able to focus and direct the first light beam 30 from one corner of the lensing array 50 all the way to an opposite corner of the focusing plane 48. In such a case, portions of a full-frame first light beam 30 that illuminates the entire focusing plane 48, may be directed to portions of the target 24 outside of the desired output beam shape 22 where they may waste energy and where they may cause other detrimental effects such as causing undesired portions of the target 24 to be melted or otherwise adversely affected. According to an aspect of the present disclosure, portions of the first light source 26 may be individually controlled according to a projection map to inhibit point sources which are not able to be formed into the desired output beam shape 22 upon a target 24. The controller 34 may generate a projection map which may vary according to the desired output beam shape 22 and the predetermined capabilities of the lensing array 50 to focus and direct the first light beam 30 into the output beam shape 22 upon the target 24. Individual point sources or groups of point sources within the first light source 26 may then be selectively illuminated according to the projection map, with point sources that are not capable of being focused onto the desired beam shape 22 being left off.

A beam combiner 64, which may be a dichroic mirror with different reflectivity to different wavelengths λ1, λ2 of light, may be disposed between the first light source 26 and the focusing plane 48 and at a deflection angle 66 for directing the second light beam 44 from the projector 40 onto the focusing plane 48 and allowing the first light beam 30 from the first light source 26 to pass through to the focusing plane 48. In other words, the beam combiner 64 combines the first light beam 30 together with the second light beam 44, with the combined light beams 30, 44 then being directed to the focusing plane 48. The deflection angle 66 may be, for example, 45 degrees from the path 32 of the first light beam 30. The deflection angle 66 may vary depending on the relative angle between the first and second light beams 30, 44.

Figure 4:
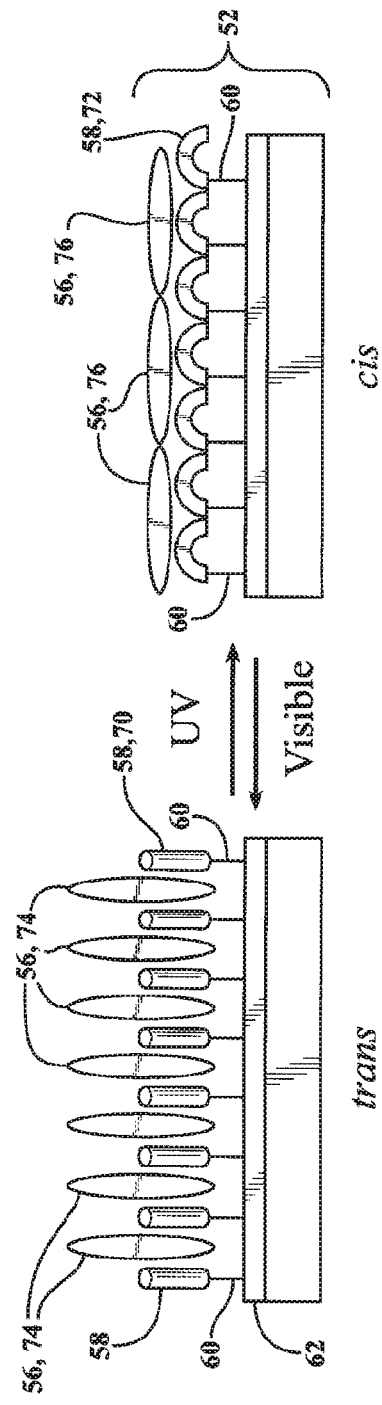
FIG. 4 is a schematic view of an arrangement of a photoactive cell.
Figure 5:
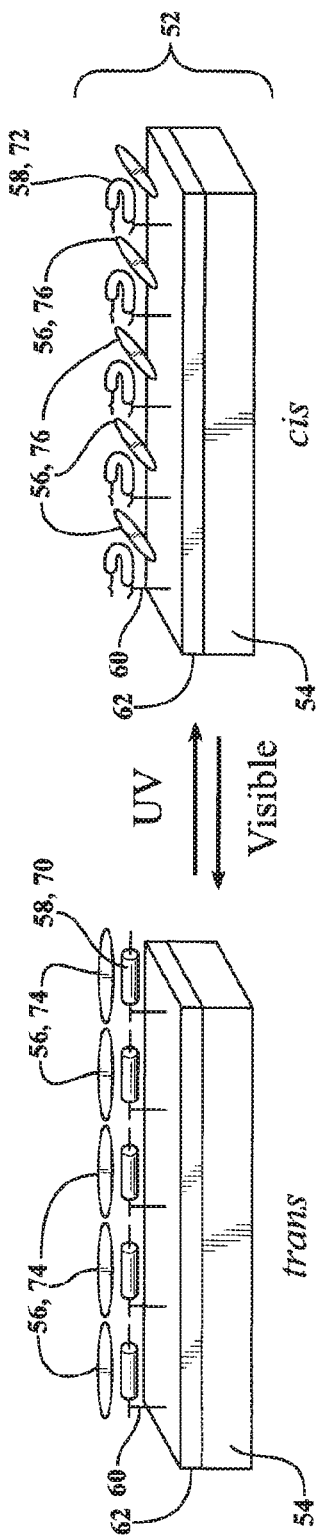
FIG. 5 is a schematic view of an alternative arrangement of a photoactive cell.
Figure 6:
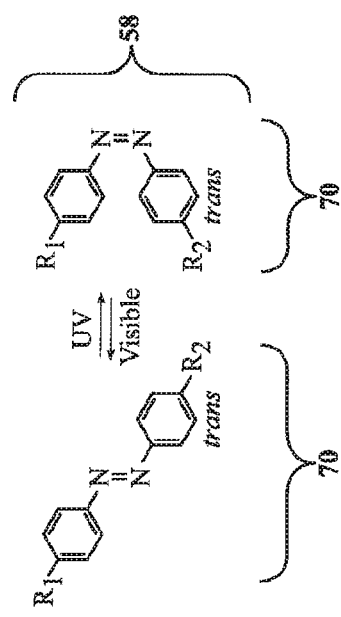
FIG. 6 is diagram of the Azobenzine molecule in two different configurations.
Figure 7:
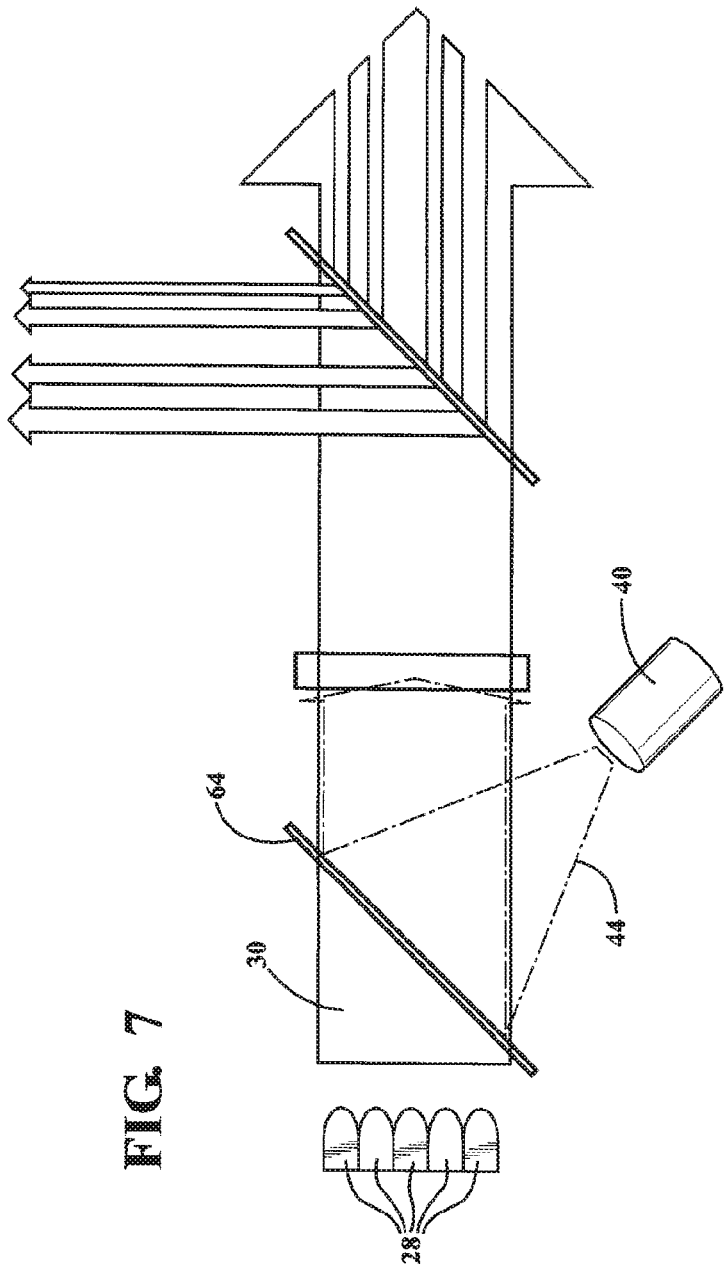
FIG. 7 is a schematic diagram of an adaptive mask of a type known in the prior art.
Figure 8:
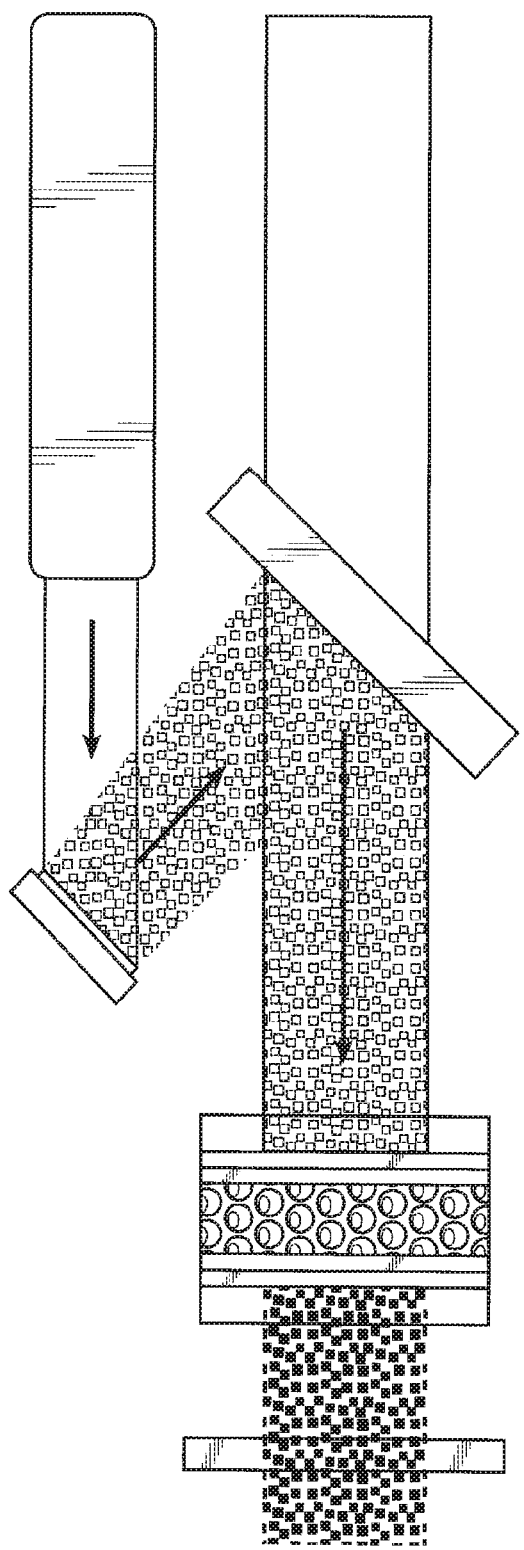
FIG. 8 is another schematic diagram of an adaptive mask of a type known in the prior art.
Figure 10:
FIG. 10 is an output beam shape formed by a light beam focused according to the phase pattern of FIG. 9, shown in Damberg et al. "Efficient Freeform Lens Optimization for Computational Caustic Displays." Optics Express 23.8 (pub. 13 Apr. 2015)
Figure 9:
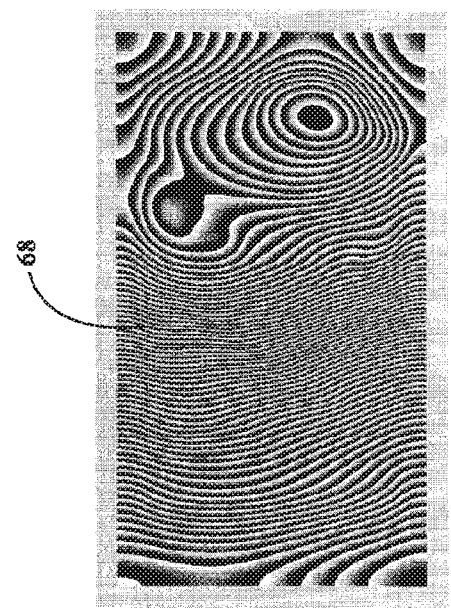
FIG. 9 is an example of a phase pattern shown in Damberg et al. "Efficient Freeform Lens Optimization for Computational Caustic Displays." Optics Express 23.8 (pub. 13 Apr. 2015)
Figure 11:
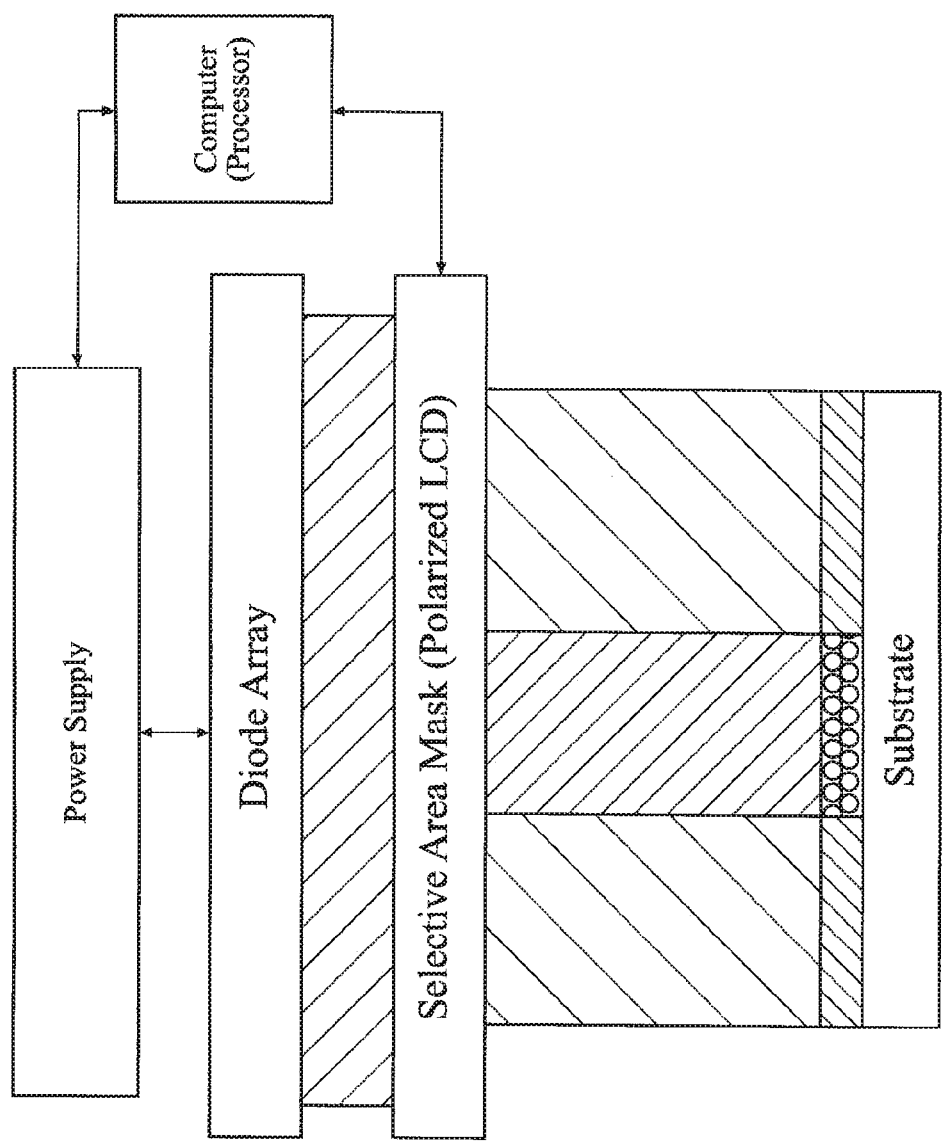
FIG. 11 is a schematic view of a "System for Performing Additive Manufacturing ('AM') Fabrication Process Using a High-Power Diode Array and a Mask," as disclosed in prior art U.S. Patent Application Publication No. 2014/0252687 (Sep. 11, 2014)
Figure 12:
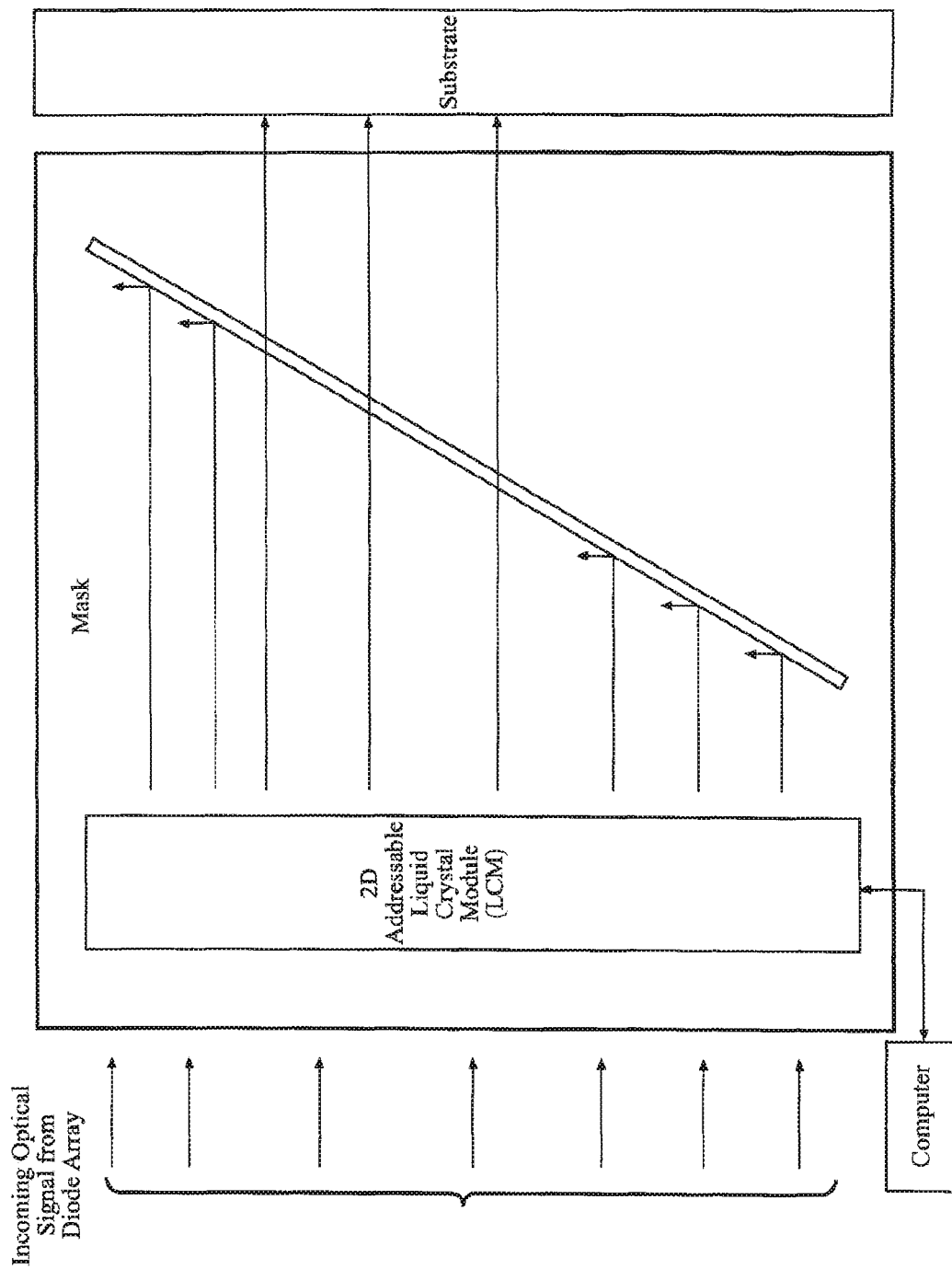
FIG. 12 is a schematic view of the system of FIG. 11 "showing how a portion of the optical rays from the diode array are reflected by a polarizing mirror during the fabrication process to prevent them from reaching the substrate," as disclosed in prior art U.S. Patent Application Publication No. 2014/0252687 (Sep. 11, 2014)
Figure 13:
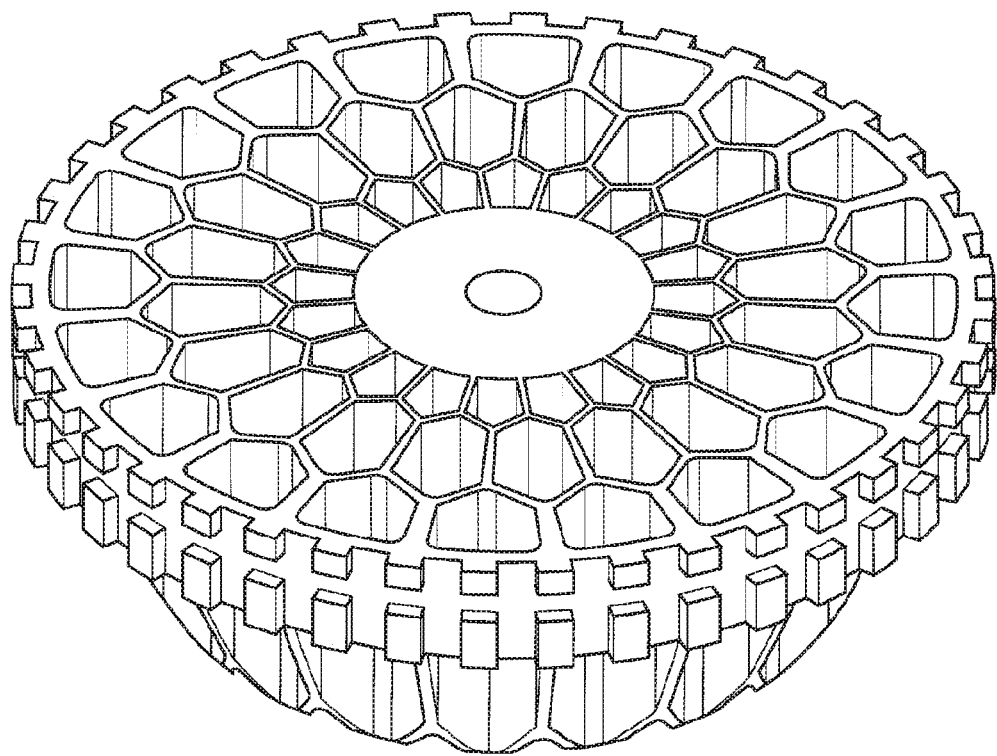
FIG. 13 is a perspective view of a "hollow wheel" part having approximately 18% areal density.
Figure 14:
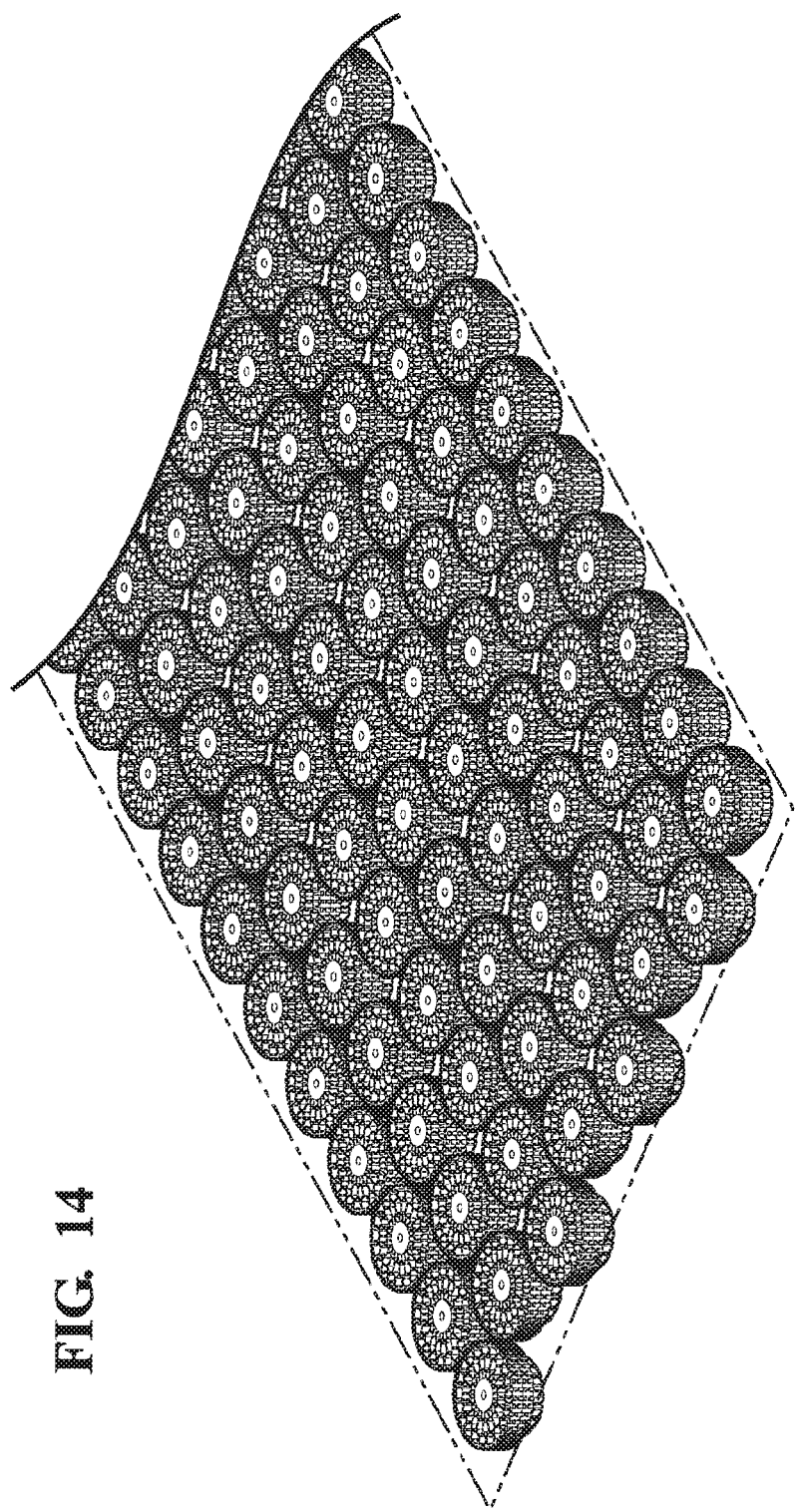
FIG. 14 is a perspective view of a plurality of "hollow wheel" parts of FIG. 13 in a maximized build area of 158 parts in 1×0.5 m.
Figure 15:
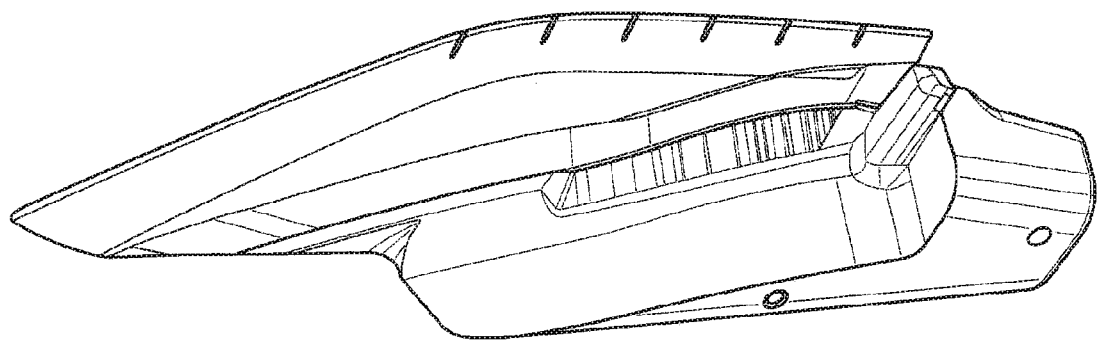
FIG. 15 is a perspective view of a "solid lifter structure" part having approximately 75% areal density.
Figure 16:
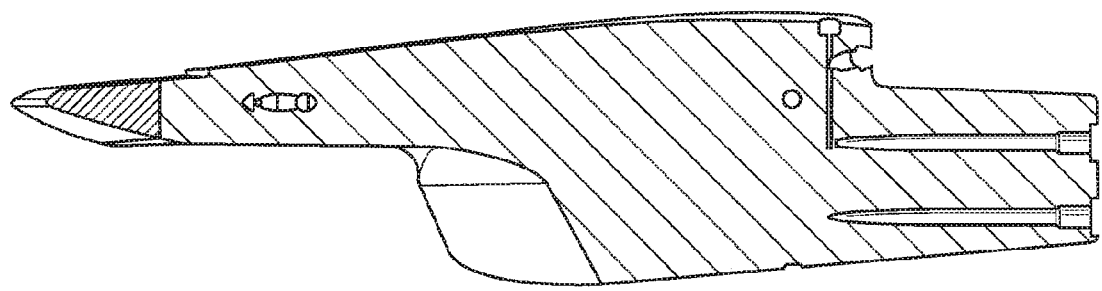
FIG. 16 is an overhead view of a slice of the "solid lifter structure" part of FIG. 15.

As shown in FIGS. 4-6, each of the photoactive cells 52 includes at least one liquid crystal molecule 56 adjacent at least one photoreactive group 58 of Azobenzene connected by a spacer chain 60 of flexible hydrocarbon to a photoalignment layer 62 of polymer material disposed on the carrier sheet 54. The photoreactive groups 58 of the photoactive cells 52 undergo a reversible change from a first molecular shape 70 to a second molecular shape 72 in response to light energy at the second wavelength n. Specifically, the photoreactive group 58 being in the first molecular shape 70 causes adjacent ones of the liquid crystal molecules 56 to be in a first orientation 74 and the photoreactive group 58 being in the second molecular shape 72 causes adjacent ones of the liquid crystal molecules 56 have a second orientation 76 different from the first orientation 74. The different orientations 74, 76 of the liquid crystal molecules 56 cause the photoactive cells 52 to assume different indices of refraction having a range or gradient of different values. The photoreactive groups 58 of the photoactive cells 52 may change back to the first molecular shape in response to light energy at the different wavelength than the second wavelength n, such as visible light. This change-back in molecular shape of the photoreactive groups 58 thereby resets the index of refraction of the respective photoactive cells 52. The projector 40 may provide the light energy at the different wavelength than the second wavelength λ2 to perform such a resetting function. An additional light source may also be used to perform the resetting function.

Accordingly, the index of refraction 78 of each photoactive cell 52 varies according to the initial pattern 38 to define the phase pattern 68 in the lensing array 50 for curving and focusing the first light beam 30 to form a third light beam 69 that defines the output beam shape 22 on the target 24. Because the lensing array 50 focuses the first light beam 30 to form the output beam shape 22 instead of masking or filtering a portion of the first light beam 30, as is done in the prior art, substantially all of the first light beam 30 is transmitted to the target 24 in the form of the third light beam 69.

The subject invention also includes a method of operating a dynamic lens 20 to generate an output beam shape 22. The method includes a first step of generating a first light beam 30 having a first wavelength λ1 by a first light source 26. A second step of the method is generating a control signal 36 by the controller 34 for the initial pattern 38 corresponding to the desired output beam shape 22. The next step is for the controller 34 to transmit the control signal 36 to the projector 40. A fourth step of the method is for a second light source 42 to generate a second light beam 44 having a second wavelength λ2 different from the first wavelength λ1. A fifth step is for a spatial light modulator 46 of the projector 40 to form the second light beam 44 to the initial pattern 38 according to the control signal 36. The next step in the method is for the projector 40 to project the light with the second wavelength λ2 having the initial pattern 38 as a second light beam 44. The beam combiner 64 may perform the seventh step of reflecting the second light beam 44 with the initial pattern 38 onto the lensing array 50. Alternatively, the second light beam 44 with the initial pattern 38 may be directly projected upon the lensing array 50 by the projector 40. The beam combiner 64 may also perform the eighth step of transmitting the first light beam 30 from the first light source 26 onto the lensing array 50. Alternatively, the first light beam 30 may be transmitted from the first light source 26 onto the lensing array 50 without passing through a beam combiner 64. The seventh and eighth steps together comprise a broader step of "combining" the first and second light beams 30, 44. The method includes a ninth step in which the index of refraction 78 each of the photoactive cells 52 of the lensing array 50 is adjusted according to the initial pattern 38 to create the phase pattern 68 in the lensing array 50. The method concludes with the lensing array 50 performing the tenth step of focusing and directing the first light beam 30 according to the phase pattern 68 to form a third light beam 69 defining the output beam shape 22 on the target 24.

The dynamic lens 20 may be used in conjunction with an adaptive mask, such as the type disclosed in Marshall et al. "Computational Chemistry Modeling and Design of Photoswitchable Alignment Materials for Optically Addressable Liquid Crystal Devices." 142 LLE Review at 151 (2015) and/or U.S. Patent Application Publication No. 2014/0252687. In such a case, the adaptive mask may be used to further resolve output beam shapes 22 upon the target 24.

Two or more dynamic lenses 20 may be combined serially to further resolve the output beam shapes 22 upon the target 24.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A system for additive manufacturing, comprising:
   a target comprising a powder;
   a dynamic lens for projecting an output beam shape upon the target to fuse the powder into a solid mass, said dynamic lens comprising:
   a first light source generating a first light beam having a first wavelength,
   a projector including a second light source generating a second light beam having a second wavelength different from said first wavelength and forming said second light beam to an initial pattern,
   a focusing plane including a lensing array of photoactive cells for refracting said first light beam in response to stimulation by said second light beam having said second wavelength,
   said initial pattern of said second wavelength light from said projector causing said lensing array of said photoactive cells to form a phase pattern to curve and focus said first light beam to form the output beam shape on the target.

2. The system for additive manufacturing as set forth in claim 1 wherein substantially all of said first light beam is transmitted to the target in the form of said third light beam.

3. The system for additive manufacturing as set forth in claim 1 further including a beam combiner for directing said second light beam from said projector onto said focusing plane and passing said first light beam onto said focusing plane.

4. The system for additive manufacturing as set forth in claim 1 wherein said first light source comprises a plurality of laser diodes.

5. The system for additive manufacturing as set forth in claim 1 wherein said first light beam has a high-power of at least about 10 kW.

6. The system for additive manufacturing as set forth in claim 1 further including a controller generating a control signal corresponding to said initial pattern and configured to transmit said control signal to said projector.

7. The system for additive manufacturing as set forth in claim 6 wherein said projector includes a spatial light modulator to form said second light beam to said initial pattern according to said control signal.

8. The system for additive manufacturing as set forth in claim 1 wherein said focusing plane includes a lensing array of photoactive cells disposed upon a carrier sheet and variably refracting said first light beam in response to stimulation by said second light beam having said second wavelength,
   wherein each of said photoactive cells includes at least one liquid crystal molecule adjacent at least one photoreactive group connected to a photoalignment layer disposed on said carrier sheet, and
   wherein said photoreactive groups of said photoactive cells undergo a reversible change from a first molecular shape to a second molecular shape in response to light energy at said second wavelength.

9. The system for additive manufacturing as set forth in claim 8 wherein said photoreactive group comprises Azobenzene.

10. The system for additive manufacturing as set forth in claim 8 wherein said spacer chain comprises flexible hydrocarbon.

11. The system for additive manufacturing as set forth in claim 8 wherein said photoalignment layer comprises polymer material.

12. The system for additive manufacturing as set forth in claim 1 wherein said first light source includes an array of point sources with each of said point sources generating a portion of said first light beam.

13. The system for additive manufacturing as set forth in claim 12 wherein said point sources are individually controlled according to a projection map, and with said projection map causing each of said point sources to selectively illuminate a corresponding portion of said focusing plane.

14. The system for additive manufacturing of claim 1 wherein the dynamic lens is configured to perform selective laser sintering (SLS).

15. A method of performing additive manufacturing with a dynamic lens, comprising:
- generating by a first light source a first light beam having a first wavelength,
- generating by a second light source a second light beam having a second wavelength different from the first wavelength,
- projecting by a projector the second light beam having the initial pattern,
- directing the second light beam having the initial pattern onto a lensing array having a plurality of photoactive cells,
- adjusting each of the photoactive cells of the lensing array according to the initial pattern to create a phase pattern in the lensing array,
- focusing and directing the first light beam by the lensing array according to the phase pattern to form an output beam shape upon a target including a powder;
- fusing the powder of the target into a solid mass having the output beam shape.

16. The method of performing additive manufacturing as set forth in claim 15 further including:
- generating by a controller a control signal for the initial pattern corresponding to the desired output beam shape, and
- transmitting by the controller the control signal to the projector.

17. The method of as set forth in claim 15, further including:
- combining by a beam combiner the first light beam and the second light beam onto the lensing array.

18. The method of performing additive manufacturing as set forth in claim 15, wherein the step of projecting by a projector the second light beam having the initial pattern further comprises: forming the second light beam to the initial pattern by a spatial light modulator.

19. The method of performing additive manufacturing as set forth in claim 15, further including: sintering the target to create a solid structure with the output beam shape.

* * * * *